United States Patent
Khatri

(10) Patent No.: US 10,460,111 B2
(45) Date of Patent: Oct. 29, 2019

(54) SYSTEM AND METHOD TO ISOLATE HOST AND SYSTEM MANAGEMENT IN AN INFORMATION HANDLING SYSTEM

(71) Applicant: DELL PRODUCTS, LP, Round Rock, TX (US)

(72) Inventor: Mukund P. Khatri, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 118 days.

(21) Appl. No.: 15/669,400

(22) Filed: Aug. 4, 2017

(65) Prior Publication Data

US 2019/0042755 A1  Feb. 7, 2019

(51) Int. Cl.
*G06F 21/57*  (2013.01)
*G06F 8/65*  (2018.01)
*G06F 9/4401*  (2018.01)

(52) U.S. Cl.
CPC .............. *G06F 21/575* (2013.01); *G06F 8/65* (2013.01); *G06F 9/4401* (2013.01)

(58) Field of Classification Search
CPC ......... G06F 21/575; G06F 8/65; G06F 9/4401
See application file for complete search history.

(56) References Cited

U.S. PATENT DOCUMENTS

| 7,768,911 B2* | 8/2010 | Savagaonkar | H04L 63/1416 370/230 |
| 8,219,792 B2 | 7/2012 | Jaber et al. | |
| 2006/0005245 A1* | 1/2006 | Durham | G06F 21/85 726/25 |
| 2011/0252153 A1* | 10/2011 | Vlodavsky | G06F 21/305 709/229 |
| 2013/0013905 A1* | 1/2013 | Held | G06F 21/575 713/2 |
| 2014/0068024 A1 | 3/2014 | Bhosle et al. | |
| 2014/0195711 A1 | 7/2014 | Bhatia et al. | |

* cited by examiner

*Primary Examiner* — Jaweed A Abbaszadeh
*Assistant Examiner* — Gayathri Sampath
(74) *Attorney, Agent, or Firm* — Larson Newman, LLP

(57) ABSTRACT

An information handling system includes a central processing unit, a memory, and a service processor. The central processing unit executes an operating system of the information handling system. The memory stores a boot image for a boot process of the information handling system. The service processor executes the boot image to perform the boot process, and to cause the service processor to detect whether an isolation profile is selected within the boot process; and in response to the isolation profile being selected, to disable Intelligent Platform Management Interface system management from the operating system to prevent system management access by the operating system to the service processor.

20 Claims, 3 Drawing Sheets

SYSTEM AND METHOD TO ISOLATE HOST AND SYSTEM MANAGEMENT IN AN INFORMATION HANDLING SYSTEM

FIELD OF THE DISCLOSURE

The present disclosure generally relates to information handling systems, and more particularly relates to isolating the host and system management in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a central processing unit, a memory, and a service processor. The central processing unit may execute an operating system of the information handling system. The memory may store a boot image for a boot process of the information handling system. The service processor may execute the boot image to perform the boot process, and may cause the service processor to detect whether an isolation profile is selected within the boot process; and in response to the isolation profile being selected, to disable Intelligent Platform Management Interface system management from the operating system to prevent system management access by the operating system to the service processor.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
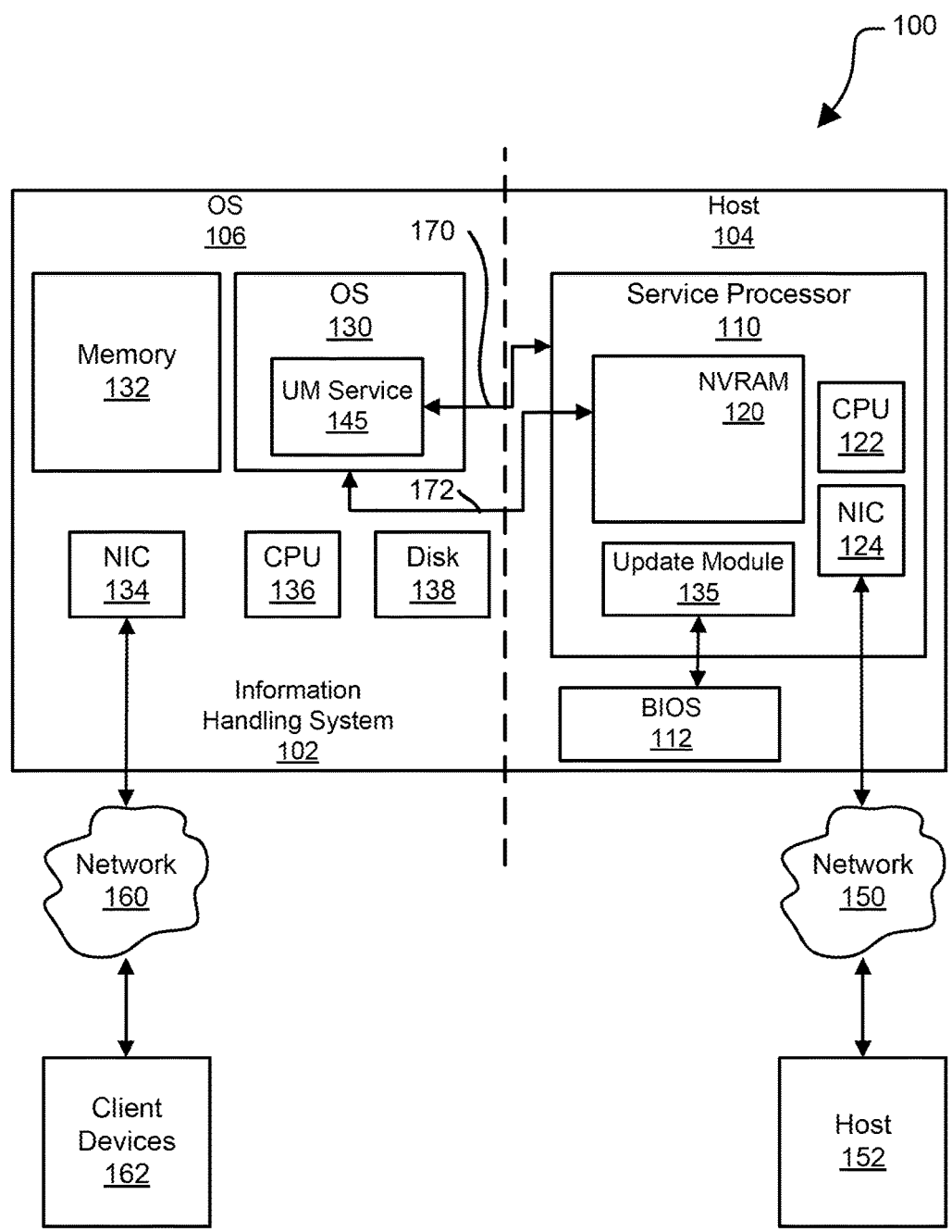
FIG. 1 is block diagram of a system that obtains device drivers from an out-of-band management network according to at least one embodiment of the disclosure.

FIG. 1 shows a system 100 including an information handling system 102. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more buses operable to transmit communications between the various hardware components.

FIG. 1 illustrates the system 100 including the information handling system 102, host 152, and client devices 162. In an embodiment, the information handling system 102 can be a server. The information handling system 100 can be divided into a host portion 104 and an operating system (OS) portion 106. The host portion 104 of the information handling system 102 includes a service processor 110 and a basic input/output system (BIOS) 112. The service processor 110 represents an integrated device or devices that is utilized to provide out-of-band management functions to the information handling system 102 that includes management system, and can include a chassis management controller (CMC), a baseboard management controller (BMC), a management engine (ME), an integral part of a Dell remote access controller (DRAC), or an integrated Dell remote access controller (iDRAC), which are systems management hardware and software solutions operable to provide remote management capabilities and that operate according to the an Intelligent Platform Management Interface (IPMI) specification, such as an IPMI Specification V2.0.

The service processor 110 of the information handling system 102 is connected to the host 152 through network 150, and to other the client devices 162 through the network 160. In some embodiments, the network 150 may comprise an out-of-band management network and the network 160 may comprise a client, OS, or in-band network. Other client devices 162 may be a client device communicating with information handling system 102 or may be another server of the system 100 that operates information handling system 102.

The OS portion 106 of the information handling system 102 includes operating system (OS) 130, a memory 132, a network interface card (NIC) 134, a central processing unit (CPU) 136, and a disk 138. The service processor 110 includes a non-volatile random access memory (NVRAM) 120, a CPU 122, a NIC 124, and an update module 135. For purposes of this application, the term NVRAM refers to all non-volatile memory technologies. The service processor 110 may be any system, device, apparatus or component of information handling system 102 configured to permit an administrator or other person to remotely monitor and/or remotely manage information handling system 102 (for example, by an information handling system remotely connected to information handling system 102 via the network 150) regardless of whether information handling system 102 is powered on and/or has an operating system installed thereon. In certain embodiments, the service processor 110 may allow for out-of-band control of information handling system 102. Out-of-band communications refer to communications that may bypass an operating system, such as OS 130. The communications may utilize hardware resources and components that are independent of an operating system. In the embodiment of FIG. 1, network communications to and from the service processor 110 are sent through the NIC 124 that is physically isolated from the in band communication through network interface card 134. The NIC 124 may serve as an interface between the service processor 110 and the network 150. The NIC 124 may enable the service processor 110 to communicate over the network 150 using any suitable transmission protocol and/or standard.

In some embodiments, an administrator may be able to diagnose problems that have caused failure of information handling system 102. In the same or alternative embodiments, the service processor 110 may allow an administrator to remotely manage one or more parameters associated with operation of information handling system 102 such as power usage, processor allocation, memory allocation, or security privileges.

CPU 122 may be communicatively coupled to NVRAM 120, the NIC 124, and update module 135. CPU 122 may also be electrically coupled to a power source dedicated to the service processor 110. CPU 122 may include any system, device, or apparatus configured to interpret and/or execute program instructions and/or process data, and may include, without limitation a microprocessor, microcontroller, or any other digital or analog circuitry configured to interpret and/or execute program instructions and/or process data. In some embodiments, CPU 122 may interpret and/or execute program instructions and/or process data stored in NVRAM 120, update module 135, and/or another component of the service processor 110.

Update module 135 may obtain code for use on information handling system 102. For purposes of this disclosure, code includes software, firmware, and other forms of computer programs. Update module 135 may make the code available to information handling system 102. The code may be updates of previously installed code or may be for initial installation. Some of the code may be downloaded from the host 152 over the network 150. Update module 135 may constitute an advanced embedded system management tool for automated updates of system code, code inventory, code rollback (restoration of code to a previous version), and code correction. Update module 135 may reside in non-volatile memory, such as in NVRAM 120, may be started during a boot sequence, and may function in a pre-operating system environment. In some embodiments, the host 152 may be part of a cloud-computing facility. Cloud computing may refer to the access of computing resources and data via a network infrastructure, such as the Internet. The computing resources and data storage may be provided by linked data centers of the network infrastructure. In many embodiments, cloud computing resources are provided on demand to customers. As a result, the customers may have access to needed computer resources without having to purchase equipment or construct data centers.

Operating system 130 includes update manager service 145. Update manager service 145 is a service or daemon, a computer program that runs as a background process. Daemons may be started at boot time and may respond to network requests, hardware activity, or other programs by performing some task. Daemons may also configure hardware and run scheduled tasks. Update manager service 145 may be created by an operating system vendor or may be installed during the manufacture of information handling system 102.

In the embodiment of FIG. 1, update manager service 145 communicates with the service processor 110 about code, such as device drivers. A device driver may constitute software that acts as an interface between hardware and operating system 130 or another higher-level program. The device driver may communicate with the hardware over a communications bus. It may receive calls from the higher-level program and issue commands to the hardware in response to the commands.

Update manager service 145 may, for example, constantly scan for deployment of new hardware. If it detects new hardware, it may send a message to the service processor 110 to provide device drivers needed for the new hardware. The messages may be sent under a standard management protocol, such as Intelligent Platform Management Interface (IPMI) or WS-Management (WS-Man). Similarly, update manager service 145 may receive messages from the service processor 110 of the availability of code for use by operating system 130, such as the availability of device drivers for newly-installed hardware or updated device drivers and may inform operating system 130.

However, if the OS 130 becomes compromised, the compromised OS 130 can bypass a system configuration and other firmware settings, via the IPMI interface 172, such that the compromised OS 130 can overwrite settings of the information handling system 102 set by the service processor 110. In an embodiment, the compromised OS 130 can also allow the manager service 145 to change firmware and other infrastructure settings via a ME driver 170. Thus, if the OS 130 becomes corrupted/compromised the secure out-of-band management channel from the host 152 to the service processor 110 via the network 150 can become ineffective to properly manage the firmware within the BIOS 112 and other infrastructure of the information handling system 102.

Thus, the host 152 may isolate the host portion 104 from the OS portion 106 of the information handling system 102 to prevent a compromised OS 130 from maliciously managing the infrastructure of the information handling system 102. The host 152 can provide the service processor 110 with a firmware setting/configuration to isolate the host portion 104 from the OS portion 106 of the information handling system 102. Thus, the host 152 can provide the firmware setting/configuration to isolate the host portion 104 from the OS portion 106 of the information handling system 102 via an out-of-band communication. The service processor 110 can then store the firmware setting/configuration as an isolation profile in the BIOS 112.

After the isolation profile is stored in the BIOS 112, the host 152 can enable or disable the isolation profile to control with the host portion 104 is isolated from the OS portion 106 of the information handling system 102. If the isolation profile is enabled, the firmware in the BIOS 112 can disable a driver for the IPMI interface 172 in between the OS 130 and the service processor 110, and can disable the ME driver 170 in between the management service 145 and the service processor 110. Disabling the IPMI interface 172 and the ME driver interface 170 can result in the OS 130 not loading any system management drivers. Thus, the OS 130 does not have any communication mechanism to provide management updates to the service processor 110 of the host portion 104. In this situation, management updates to the infrastructure of the information handling system 102 can only come from the host 152 via a secure out-of-band communication through the network 150. While the host portion 104 is isolated from the OS portion 106 of the information handling system 102, the client devices 162 can continue to provide operating system updates to the OS 130

Figure 2:
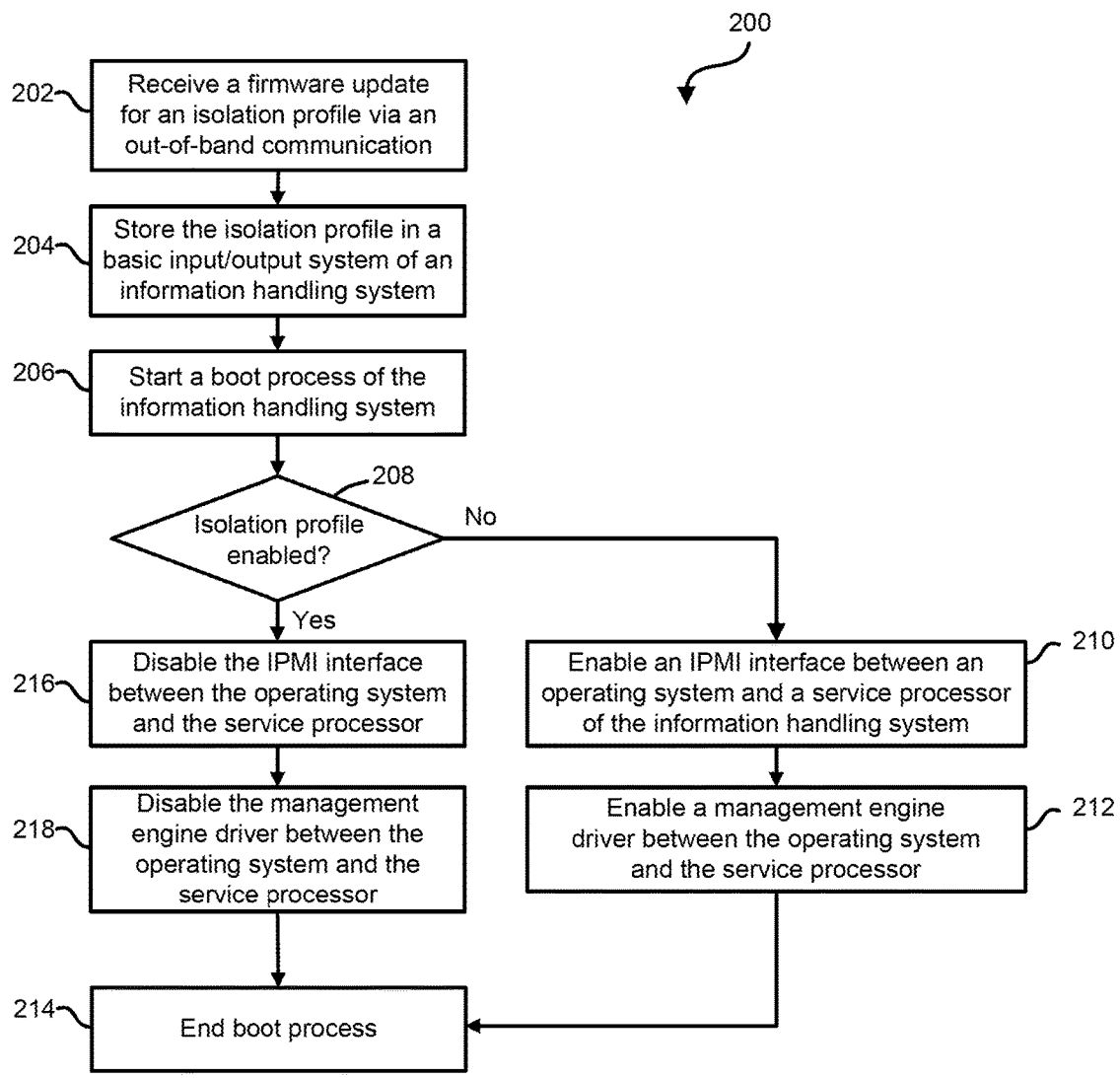
FIG. 2 is a flow diagram of a method for isolating a host portion of an information handling system from an operating system portion of the information handling system according to at least one embodiment of the present disclosure.
Figure 3:
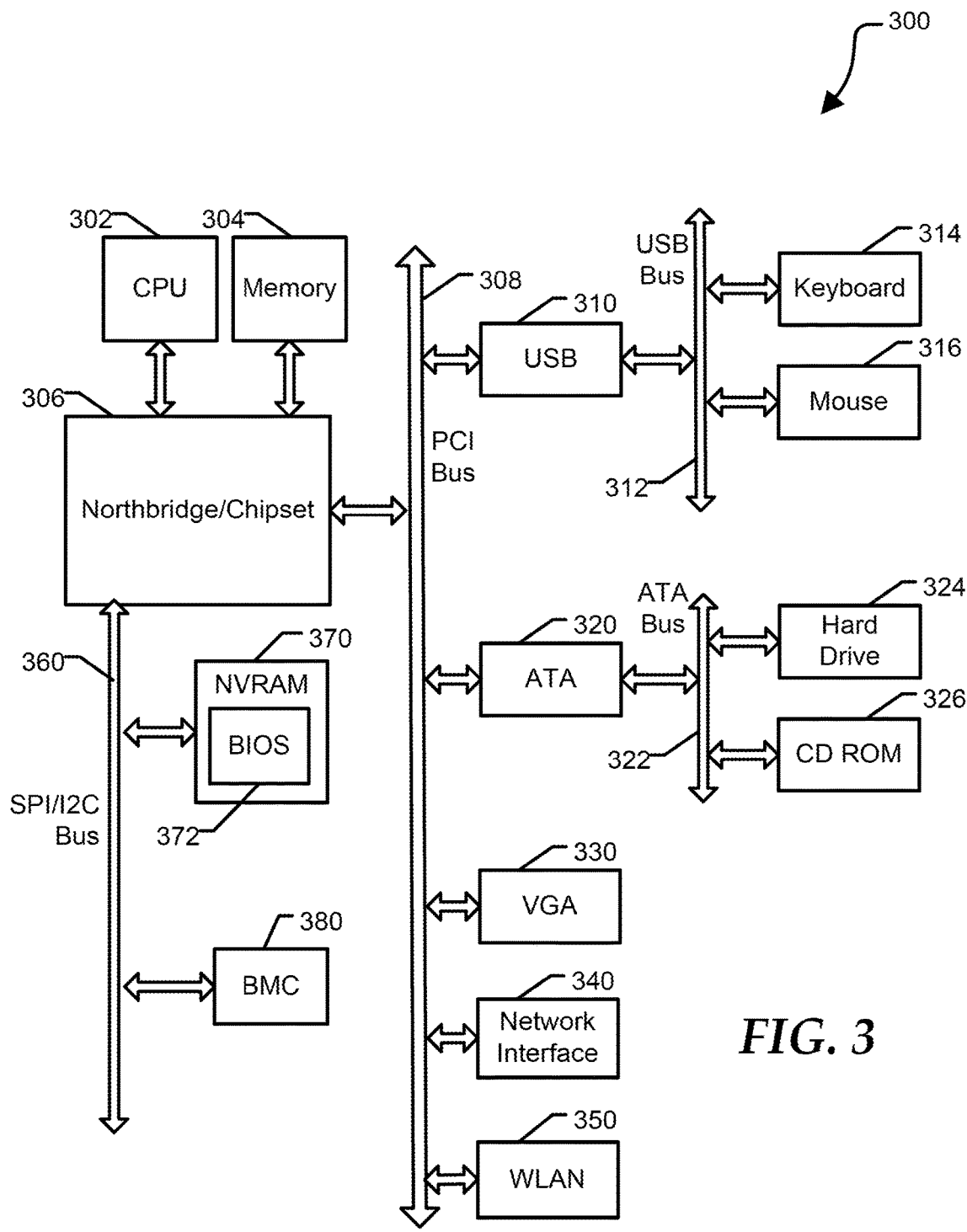
FIG. 3 is a block diagram of a general information handling system according to an embodiment of the present disclosure.

FIG. 2 illustrates a method 200 for isolating a host portion of an information handling system from an operating system portion of the information handling system according to at least one embodiment of the present disclosure. At block 202, a firmware update for an isolation profile of an information handling system is received via an out-of-band communication. In an embodiment, the out-of-band communication can come from a host/administrator of the information handling system. The isolation profile is stored in a basic input/output system (BIOS) of the information handling system at block 204. In an embodiment, the isolation profile can be a BIOS setting that can be enabled or disabled during a BIOS setup operation. At block 206, a BIOS boot process of the information handling system is started.

At block 208, a determination is made whether the isolation profile is enabled. In an embodiment, the isolation profile can be enabled in response to a signal from the a host via an out-of-band communication. If the isolation profile is not enabled, an Intelligent Platform Management Interface (IPMI) interface between an operating system and a service processor of the information handling system is enabled at block 210. At block 212, a management engine driver is enabled between the operating system and the service processor. The IPMI interface and management engine driver, when enabled, can allow updates to the infrastructure of the information handling system via the operating system. The boot process is ended at block 214.

If at block 208, the isolation profile is enabled, the IPMI interface is disabled between the operating system and the service processor at block 216. At block 218, the management engine driver is disabled between the operating system and the service processor. In an embodiment, disabling the IPMI interface and the management engine driver interface can result in the operating system not loading any system management drivers. Thus, the operating system does not have any communication mechanism to provide management updates to the service processor of the information handling system. In this situation, management updates to the infrastructure of the information handling system can only come from a host via a secure out-of-band communication. At block 214, the boot process is ended.

FIG. 6 illustrates a general information handling system 600 including a processor 602, a memory 604, a northbridge/chipset 606, a PCI bus 608, a universal serial bus (USB) controller 610, a USB 612, a keyboard device controller 614, a mouse device controller 616, a configuration an ATA bus controller 620, an ATA bus 622, a hard drive device controller 624, a compact disk read only memory (CD ROM) device controller 626, a video graphics array (VGA) device controller 630, a network interface controller (NIC) 640, a wireless local area network (WLAN) controller 650, a serial peripheral interface (SPI) bus 660, a NVRAM 670 for storing BIOS 672, and a baseboard management controller (BMC) 680. BMC 680 can be referred to as a service processor or embedded controller (EC). Capabilities and functions provided by BMC 680 can vary considerably based on the type of information handling system. For example, the term baseboard manageament system is often used to describe an embedded processor included at a server, while an embedded controller is more likely to be found in a consumer-level device. As disclosed herein, BMC 680 represents a processing device different from CPU 602, which provides various management functions for information handling system 600. For example, an embedded controller may be responsible for power management, cooling management, and the like. An embedded controller included at a data storage system can be referred to as a storage enclosure processor.

For purpose of this disclosure information handling system 600 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 600 can include processing resources for executing machine-executable code, such as CPU 602, a programmable logic array (PLA), an embedded device such as a System-on-a-Chip (SoC), or other control logic hardware. Information handling system 600 can also include one or more computer-readable medium for storing machine-executable code, such as software or data.

System 600 can include additional processors that are configured to provide localized or specific control functions, such as a battery management controller. Bus 660 can include one or more busses, including a SPI bus, an I2C bus, a system management bus (SMBUS), a power management bus (PMBUS), and the like. BMC 680 can be configured to provide out-of-band access to devices at information handling system 600. As used herein, out-of-band access herein refers to operations performed prior to execution of BIOS 672 by processor 602 to initialize operation of system 600.

BIOS 672 can be referred to as a firmware image, and the term BIOS is herein used interchangeably with the term firmware image, or simply firmware. BIOS 672 includes instructions executable by CPU 602 to initialize and test the hardware components of system 600, and to load a boot loader or an operating system (OS) from a mass storage device. BIOS 672 additionally provides an abstraction layer for the hardware, such as a consistent way for application programs and operating systems to interact with the keyboard, display, and other input/output devices. When power is first applied to information handling system 600, the system begins a sequence of initialization procedures. During the initialization sequence, also referred to as a boot sequence, components of system 600 are configured and enabled for operation, and device drivers can be installed. Device drivers provide an interface through which other components of the system 600 can communicate with a corresponding device.

Information handling system 600 can include additional components and additional busses, not shown for clarity. For example, system 600 can include multiple processor cores, audio devices, and the like. While a particular arrangement of bus technologies and interconnections is illustrated for the purpose of example, one of skill will appreciate that the techniques disclosed herein are applicable to other system architectures. System 600 can include multiple CPUs and redundant bus controllers. One or more components can be integrated together. For example, portions of northbridge/chipset 606 can be integrated within CPU 602. Additional components of information handling system 600 can include one or more storage devices that can store machine-executable code, one or more communications ports for communicating with external devices, and various input and output (I/O) devices, such as a keyboard, a mouse, and a video display. An example of information handling system 600 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 600 can include a set of instructions that can be executed to cause the information handling system to perform any one or more of the methods or computer based functions disclosed herein. The information handling system 600 may operate as a standalone device or may be connected to other computer systems or peripheral devices, such as by a network.

In a networked deployment, the information handling system 600 may operate in the capacity of a server or as a client user computer in a server-client user network environment, or as a peer computer system in a peer-to-peer (or distributed) network environment. The information handling system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single information handling system 600 is illustrated, the term "system" shall also be taken to include any collection of systems or sub-systems that individually or jointly execute a set, or multiple sets, of instructions to perform one or more computer functions.

The information handling system 600 can include a disk drive unit and may include a computer-readable medium, not shown in FIG. 6, in which one or more sets of instructions, such as software, can be embedded. Further, the instructions may embody one or more of the methods or logic as described herein. In a particular embodiment, the instructions may reside completely, or at least partially, within system memory 604 or another memory included at system 600, and/or within the processor 602 during execution by the information handling system 600. The system memory 604 and the processor 602 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components.

Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a central processing unit to execute an operating system of the information handling system;
    a memory to store a boot image for a boot process of the information handling system; and
    a service processor to execute the boot image to perform the boot process, and the execution of the boot image to cause the service processor to:
        detect whether an isolation profile is enabled within the boot process, wherein the isolation profile is enabled in response to a signal provided by a host device external to the information handling system based on the operating system being compromised; and
        in response to the isolation profile being enabled, to disable Intelligent Platform Management Interface system management from the operating system to prevent system management access by the compromised operating system to the service processor.

2. The information handling system of claim 1, the service processor further disable a management engine interface from the compromised operating system of the information handling system in response to detecting the isolation profile is enabled.

3. The information handling system of claim 2 wherein disabling the Intelligent Platform Management Interface system management and the management engine interface prevents system management drivers from being loaded in the compromised operating system.

4. The information handling system of claim 1, the service processor further to receive infrastructure management updates for the information handing system via an out-of-band communication.

5. The information handling system of claim 4 wherein the infrastructure management updates include configuration updates, health requests for the information handling system.

6. The information handling system of claim 1, the central processing unit to perform operating system level updates via in-band access through the operating system.

7. The information handling system of claim 6 wherein the operating system level updates include operating system patches, and operating system driver updates.

8. A method comprising:
    starting a boot process of an information handling system;
    detecting whether an isolation profile is enabled within the boot process, wherein the isolation profile is enabled in response to a signal provided by a host device external to the information handling system based on an operating system of the information handling system being compromised; and
    in response to detecting the isolation profile is enabled, disabling Intelligent Platform Management Interface system management from the compromised operating system of the information handling system to prevent system management access by the compromised operating system to a service processor of the information handling system.

9. The method of claim 8 further comprising:
    in response to detecting the isolation profile is enabled, disabling a management engine interface from the compromised operating system of the information handling system.

10. The method of claim 9 wherein disabling the Intelligent Platform Management Interface system management and the management engine interface prevents system management drivers from being loaded in the compromised operating system.

11. The method of claim 8 further comprising:
    receiving infrastructure management updates for the information handing system via an out-of-band communication with the service processor.

12. The method of claim 11 wherein the infrastructure management updates include configuration updates, health requests for the information handling system.

13. The method of claim 8 further comprising:
    performing operating system level updates via in-band access through the operating system.

14. The method of claim 13 wherein the operating system level updates include operating system patches, and operating system driver updates.

15. A method comprising:
    receiving, at a service processor, an isolation profile for an information handling system via an out-of-band communication from a host device external to the information handling system;
    storing, by the service processor, the isolation profile as a basic input/output system setting within a memory of the information handling system;
    starting a boot process from the basic input/output system of the information handling system;

detecting whether the isolation profile is enabled within the boot process, wherein the isolation profile is enabled in response to a signal provided by the host device based on an operating system of the information handling system being compromised; and in response to detecting the isolation profile is enabled, disabling Intelligent Platform Management Interface system management from the compromised operating system of the information handling system to prevent system management access by the compromised operating system to a service processor of the information handling system.

16. The method of claim 15 further comprising:

in response to detecting the isolation profile is enabled, disabling a management engine interface from the compromised operating system of the information handling system.

17. The method of claim 16 wherein disabling the Intelligent Platform Management Interface system management and the management engine interface prevents system management drivers from being loaded in the compromised operating system.

18. The method of claim 15 further comprising:

receiving infrastructure management updates for the information handing system via the out-of-band communication.

19. The method of claim 15 further comprising:

performing operating system level updates via in-band access through the operating system.

20. The method of claim 19 wherein the operating system level updates include operating system patches, and operating system driver updates.

* * * * *